Patented July 29, 1924.

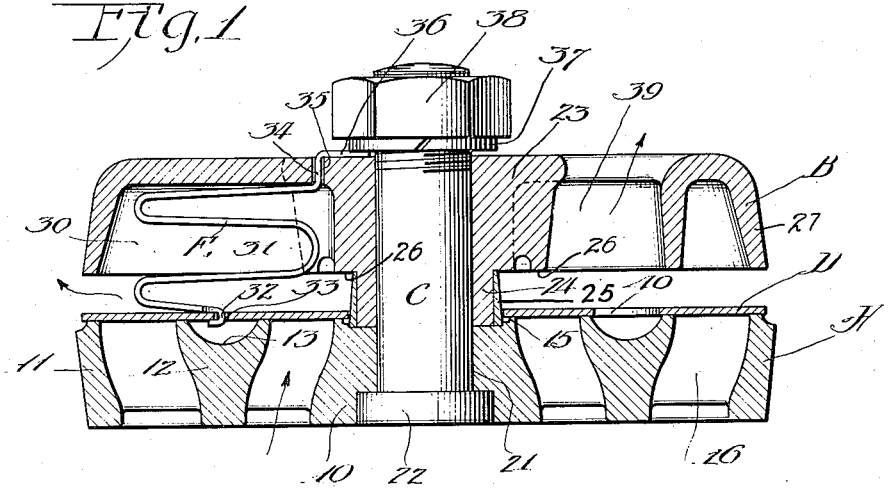
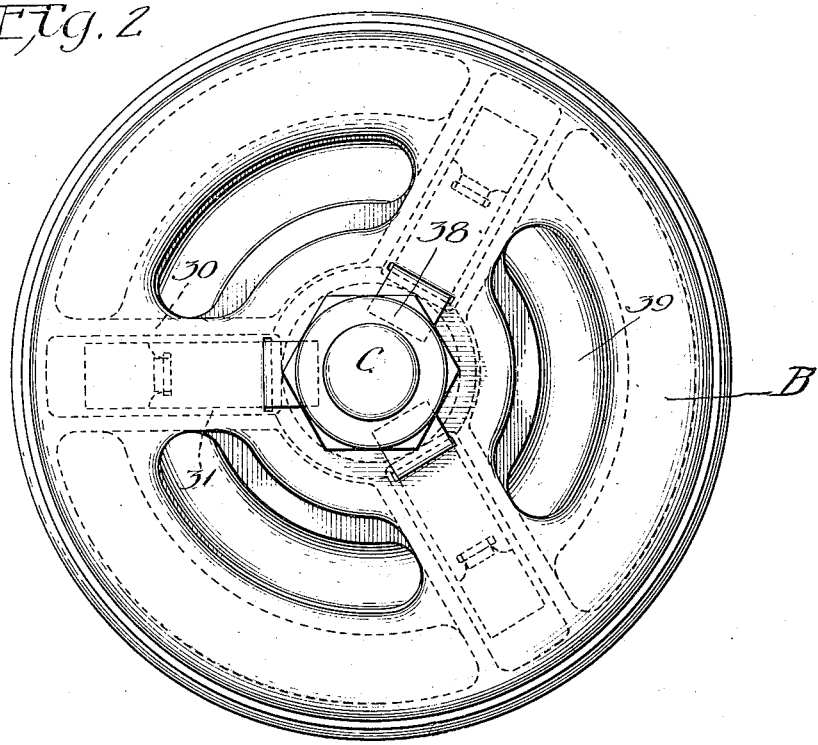

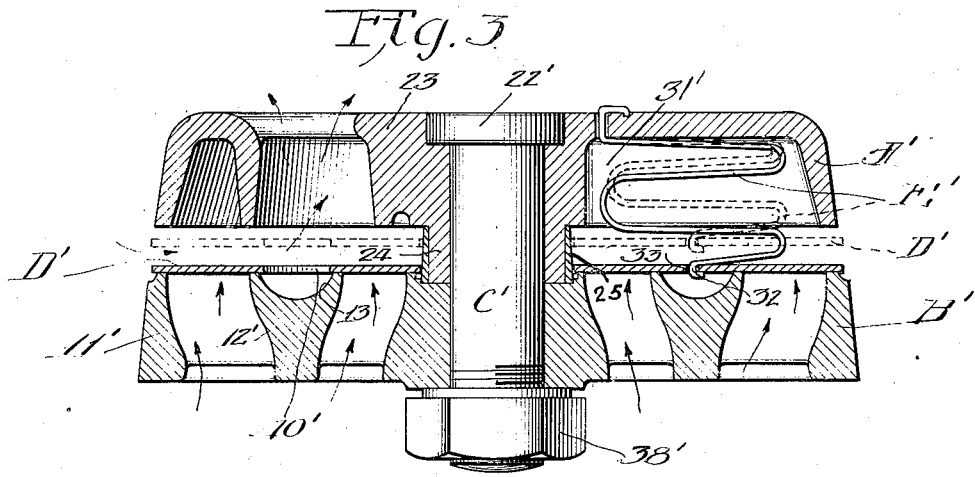
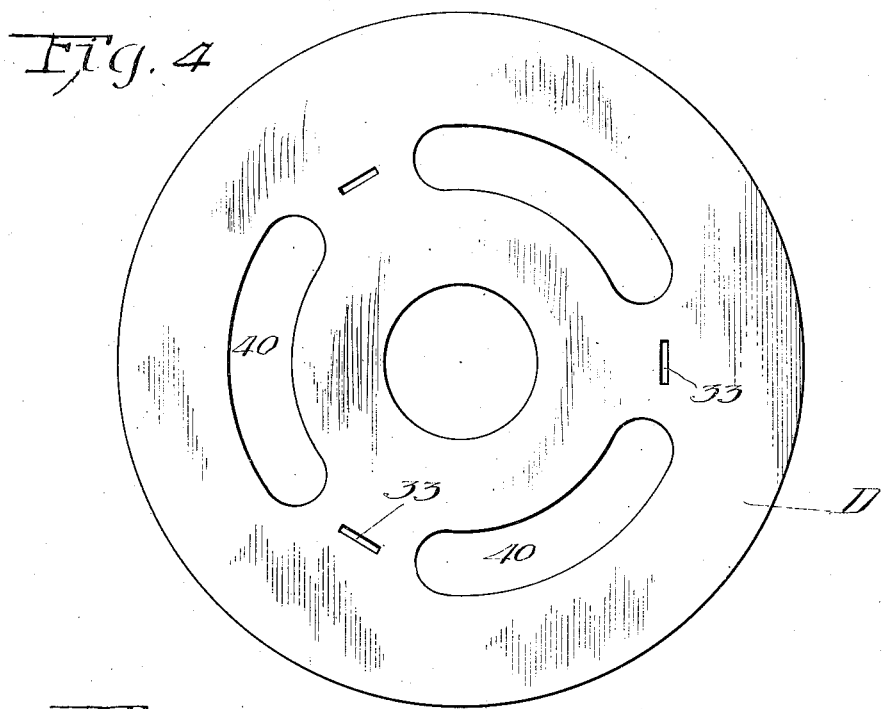

1,503,271

UNITED STATES PATENT OFFICE.

CHARLES H. LEINERT, OF CHICAGO, ILLINOIS.

VALVE FOR COMPRESSORS.

Application filed September 10, 1920, Serial No. 409,369. Renewed December 14, 1923.

*To all whom it may concern:*

Be it known that I, CHARLES H. LEINERT, a citizen of the United States, residing at Chicago, in the county of Cook and State of Illinois, have invented certain new and useful Improvements in Valves for Compressors, of which the following is a specification.

This invention relates to a valve, either suction or discharge, which is particularly adapted for use with compressors. It is of the general kind shown and described in my Patent No. 1,240,461, granted September 18, 1917, but embodies in its construction certain improved features to which reference is hereinafter made. More particularly the present invention has aimed to simplify the assembly of the springs, and to provide means permitting the valve disk to move off of its seat with a minimum of friction. Various other objects and advantages are hereinafter disclosed in the specification, wherein reference is made to the accompanying drawings, which exhibit one embodiment of my invention in the manner following—

Figure 1 is a transverse section through a discharge valve;

Fig. 2 is a plan view thereof;

Fig. 3 is a transverse section through a suction valve;

Fig. 4 is a plan view of the valve disk; and

Fig. 5 is a fragmentary detail, enlarged, in section showing the valve disk and means for centering the same.

The blowers of the type to which this invention particularly relates are usually employed for the discharge of relatively large volumes of air at comparatively low pressure, and such blowers are generally operated at a relatively high speed, so that the check valves controlling the inlet and discharge ports for air are also reciprocated at comparatively high speed. Owing to the conditions mentioned, the check valves are subjected to hard usage such as to cause their frequent wearing out, and necessitating their consequent renewal. It is accordingly an object of this invention to provide a check valve adapted for this kind of service which is cheap, efficient, and which may be easily and quickly repaired, or renewed whenever necessary, without shutting down operation of the compressor for any extended period.

Referring now particularly to Figs. 1 and 2, I have shown therein a discharge valve which consists of a valve seat A adapted to attach directly to the compressor or to a wall surrounding the same, a stop plate B connected to the valve seat through the medium of a bolt C, a valve disk D interposed between the two members, and spring means E arranged to hold the valve disk D normally upon its seat. The parts just enumerated are the only ones which enter into the construction of this valve, but they are specially formed to co-operate with each other in a peculiar manner all as will now be explained.

The valve seat A which lies inwardly of the other is formed to provide a hub 10, a rim 11, and an intermediate circular wall 12 having in its outer face an annular groove 13. The outer face of the rim 11 also constitutes a seat for the disk D which is preferably formed of sheet metal or other suitable material. The valve disk is also adapted to seat upon a flange 15 formed on the hub of the valve seat and upon the edges bordering the annular groove 13 of the wall 12, this latter part being connected to the rim and to the hub as by means of spokes 16 in a well known manner.

I provide within the hub 10 an axial bore 21 enlarged at its inner end for the purpose of receiving the bolt C whose head 22 is disposed within the enlarged portion of the bore in flush relation with the inner face of the valve seat. The bolt also extends through an axial opening 23 in the stop plate B which is provided with a hub 24 having a shoulder 26, the inner end of the hub being rested against the hub 10 of member A. Surrounding the hub 24 is a sleeve 25 which may be made of brass or any other suitable material, this sleeve being tapered for practically its entire length toward the end which rests against the stop plate B. The disk D which is centrally apertured to receive the sleeve 25 is centered in place upon the valve seat by means of this sleeve, but is disengaged therefrom as soon as it is lifted from off its seat.

The stop plate B is formed with a marginal flange 27 and with walls 30 such as to provide certain radially extending channels or compartments 31, three being the number shown, in each of which is disposed a spring E, in the general shape of the letter M for holding the valve disk to its seat. According to this invention each spring is formed to present one end 32 in the shape of a hook which is looped through a slit 33 in the disk plate (see Fig. 4), the turned end of the spring co-operating with the disk to connect the one to the other. Near its opposite end the spring is formed with a portion 34 that passes through a slot 35 in the stop plate, the spring extremity 36 being then turned to lie flat upon the upper side of the plate beneath a lock washer 37 which is held in place by a nut 38 threaded upon the end of the bolt C. It is preferred that the spring ends which are turned to lock with the valve disk or with the stop plate should be softened somewhat to better adapt them for bending in the manner shown. The transverse and longitudinal configuration of each spring is relatively unimportant, it being merely essential that suitable spring material be used, and that it be properly bent to provide a spring action which tends normally to hold the valve disk D upon its seat. Intermediately of the compartments 31 the stop plate is provided with openings 39 permitting the discharge of air that first passes through arc-shaped openings 40 in the valve disk when the latter is lifted off of its seat against the tension of the springs E. It will be noted that the disk is centered upon its seat by means of the tapered walls of the sleeve 24, but this centering action takes place only when the disk has approached closely to the seat. In any other position the disk is free of contact with the sleeve 24 so as to be unrestricted in its movements.

Referring now to Fig. 3 wherein I have shown a suction valve, it will be noted that a very similar construction is used. In this case the member A' lies to the inside of the other member B', the two being connected together through the medium of a bolt C', all as previously explained. Interiorly of these two members, however, the construction is reversed, in that the member A' is provided with compartments 31' within which are received the springs E', one end of each being passed through a slot 35' to hook upon the exterior of the member A'. The seat for the valve disk D' is formed in the member B', the valve disk being normally spring pressed away from the member A', but being movable under the influence of suction to permit the passage of air in the direction indicated by the arrows. In the construction shown in Fig. 3, the springs may be held in place without the aid of the nut 38' and lock washer which is applied to the bolt C'. The reference numerals elsewhere applied to Fig. 3 follows the scheme of those used to designate the parts of the discharge valve of Fig. 1.

It is to be observed that my valve may be readily disassembled by the removal of the nut from the bolt C whenever required for purposes of getting to the inside of the valve. The only moving part, the valve disk D, is accurately centered each time it comes to its seat, but is otherwise unhampered in its movements so as to be entirely free of friction. It is obvious, of course, that in respect of details of construction, the present valve may take other forms than the ones herein shown and described without sacrifice of the advantages and features of utility which characterize this invention, and accordingly I desire that any such modifications should be included within the scope of this patent as defined by the claims following.

I claim:

1. In a valve of the kind described, the combination of an open member formed to provide a valve seat, a valve disk adapted to rest upon the valve seat, a stop plate connected with the valve seat, and spring means interposed between the valve disk and the stop plate, there being openings formed in the valve disk and in the stop plate through which the ends of the spring means may pass, the ends of the spring means being turned to lie upon the remote side of the disk and stop plate to lock therewith, substantially as described.

2. In a valve of the kind described, the combination of an open member formed to provide a valve seat, a valve disk adapted to rest upon the valve seat, a stop plate connected with the valve seat by means of a bolt passing through from one to the other, a nut arranged to thread upon the bolt and to lie exteriorly of the stop plate, and spring means interposed between the valve disk and the stop plate, there being an opening in the stop plate through which the proximate end of the spring means is passed to lie exteriorly thereof beneath the nut, substantially as described.

3. In a valve of the kind described, the combination of an open member formed to provide a valve seat, a valve disk adapted to rest upon the valve seat, a stop plate connected with the valve seat and formed interiorly with channels between which are open spaces, spring means within each channel interposed between the valve disk and the stop plate and having one end bent in the form of a hook, there being a slot in the valve disk through which the hooked end of the spring may pass to lock therewith, the stop plate being also provided with a slot leading from each channel to the exterior of the stop plate, the spring end proximate thereto being bent to pass through the slot to the outside of the stop plate, and means exteriorly of the stop plate adapted to clamp the said end of the spring fixedly in place, substantially as described.

4. In a valve of the kind described, the combination of a valve seat, a stop plate connected therewith in spaced relation, a valve disk adapted to rest upon the valve seat, spring means connecting the valve disk with the stop plate, there being openings formed in the valve disk and in the stop plate through which the spring ends may pass, the extremities of the springs being formed to lock respectively with the valve disk and stop plate, substantially as described.

5. In a valve of the kind described, the combination of a valve seat, a stop plate spaced therefrom, a plurality of slots within said stop plate, a valve disk positioned between the valve seat and the stop plate, radially arranged springs cooperating with the valve disk and the stop plate, and constructed to urge the valve disk toward the valve seat, each of said springs having at one end thereof a struck up portion passing through one of the slots in the stop plate, means co-operating with said struck up portion for firmly but detachably connecting each of the springs to the stop plate, and means for firmly but detachably connecting the other end of each of the springs to the valve disk, substantially as described.

6. In a valve of the kind described, the combination of a stop plate having an integral central hub from which radiate a plurality of inwardly facing radial channels, a valve seat having a hub whose end is adapted to engage the proximate end of the hub of the stop plate, a detachable conection between the stop plate and valve seat extending through the hubs of each, a valve disk adapted to rest upon the valve seat, and a plurality of M springs interposed between the valve disk and stop plate, one disposed in each of the radial channels of the latter, the extremities of the several springs being so formed as to lock detachably with the valve disk and stop plate, substantially as described.

7. In a valve of the kind described, the combination of a valve seat, a stop plate connected therewith in spaced relation and formed on its inner side with a central hub from which radiate a plurality of channels, a valve disk adapted to rest upon the valve seat, and a plurality of M springs interposed between the valve disk and stop plate, one disposed within each radial channel of the latter, there being openings formed in the valve disk wherein the proximate end of each spring is engaged in a manner to firmly but detachably connect the several springs to the valve disk the opposite end of each spring being secured to the stop plate by means which are independent of its hub, substantially as described.

8. In a valve of the kind described, the combination of a circular valve seat, a circular stop plate having a hub which rests against the valve seat, a slotted circular valve disk disposed between the valve seat and the stop plate, radially arranged springs each extending outwardly from the hub and co-operating with the valve disk and the stop plate in a manner to urge the valve disk toward the valve seat, each of the said springs having one of its ends so formed as to engage detachably but firmly within one of the slots in the valve disk, and means independent of the hub for securing the other end of each spring to the stop plate, substantially as described.

9. In a valve of the kind described, the combination of a valve seat having a hub, a stop plate having marginal walls and a hub both extended toward the valve seat, the latter in engagement therewith to maintain the marginal walls of the stop plate in spaced relation to the valve seat, means providing a detachable connection between the valve seat and stop plate, a valve disk adapted to rest on the valve seat and to move toward the stop plate, and a plurality of springs interposed between the valve disk and stop plate, each of the springs connecting directly and detachably with the valve disk and extending radially between the hub and marginal walls of the stop plate and connecting detachably also with the stop plate by means which are independent of its hub, substantially as described.

CHARLES H. LEINERT.

Witness:
Ephraim Banning.